United States Patent [19]

Chen et al.

[11] Patent Number: 4,716,218
[45] Date of Patent: Dec. 29, 1987

[54] GRAIN EXTRACTION MILLING

[75] Inventors: Li-Fu Chen; Johan E. Hoff, both of West Lafayette, Ind.

[73] Assignee: Purdue Research Foundation, West Lafayette, Ind.

[21] Appl. No.: 819,413

[22] Filed: Jan. 15, 1986

[51] Int. Cl.4 .......................... C07K 3/02; C07K 3/28
[52] U.S. Cl. ................... 530/372; 260/412.3; 260/412.4; 530/370; 530/374; 530/375; 530/376; 568/917
[58] Field of Search ............... 260/412.4, 412.3; 530/374, 375, 376, 372, 370; 568/917

[56] References Cited

U.S. PATENT DOCUMENTS

| | | | |
|---|---|---|---|
| 1,275,324 | 8/1918 | Takamine et al. | 530/376 |
| 2,384,388 | 9/1945 | Monte et al. | 530/376 X |
| 2,414,195 | 1/1947 | Evans et al. | 530/376 |
| 2,461,751 | 2/1949 | Marmor et al. | 260/412.4 X |
| 2,504,962 | 4/1950 | Burdick | 530/374 X |
| 2,530,823 | 11/1950 | Kilander et al. | 530/374 X |
| 4,125,528 | 11/1978 | Rao et al. | 530/374 |
| 4,224,219 | 9/1980 | Van Blanton et al. | 530/376 X |
| 4,345,973 | 8/1982 | Ladisch et al. | 568/917 X |
| 4,376,133 | 3/1983 | Farnand | 530/370 X |
| 4,448,790 | 5/1984 | Sarkki et al. | 530/374 X |
| 4,486,353 | 12/1984 | Matsuzaki et al. | 260/412.4 |

OTHER PUBLICATIONS

R. K. Rao and L. K. Arnold, The Journal of the American Oil Chemists' Society, Oct. 11, 1955, pp. 82–84, "Alcoholic Extraction of Vegetable Oils, II., Solubilities of Corn, Linseed, and Tung Oils in Aqueous Ethanol".

Primary Examiner—Howard E. Schain
Attorney, Agent, or Firm—Cushman, Darby & Cushman

[57] ABSTRACT

A process for the production of grain oil, dehydrated alcohol, grain protein and starch, is disclosed. The invention comprises the steps of (a) drying cracked grain, (b) leaching the dried grain with an ethanol solution of 90 to 100% w/v ethanol and recovering dehydrated alcohol and grain oil, (c) extracting the residue of step (b) with a second ethanol solution containing NaOH and recovering food grade protein, and (d) separating starch and fiber from the residue of step (c) by starch hydrolysis or by grinding the residue and separating the starch and fiber by a screen and/or centrifuge.

30 Claims, 4 Drawing Figures

GRAIN EXTRACTION MILLING

The present invention relates to a milling process for recovering grain oil quantitatively, for dehydrating alcohol, for recovering edible grain protein, and for obtaining higher yields of purified starch.

BACKGROUND OF THE INVENTION

Conventional corn processing involves either wet milling or dry milling. Most processed corn has been subjected to the wet milling process. This process includes steeping of the corh to soften the corn kernels for separation of germ and endosperm, followed by grinding and high speed centrifuging to separate corn protein and fiber from corn starch. Corn oil and corn starch are the major products of this process. Corn starch can be further processed to obtain high fructose syrup. By-products of this process are fibers and corn protein. Because of the use of sulfur dioxide and bacterial activity in the steeping step, the by-products are not edible. The by-products are often combined and dried to be used as animal feed. The wet milling process can produce high purity starch, and recover corn oil. The recovery of corn oil can reduce the raw material cost by 25%. However, the operational costs of the wet milling process are high since it requires energy to dehydrate steeping water, and to operate the high speed centrifuges.

Conventional dry corn milling involves tempering the corn with steam to soften the kernel for cracking. Dry corn milling requires a smaller operating cost and a smaller capital investment, but corn oil cannot be totally recovered, and protein cannot be separated from the starch. The major products of this process are corn grits, corn meal and corn flour. Since separation of protein and starch are not necessary when corn is used in fermentation, some of the industry uses this method to prepare corn starch for fermentation. Usually, corn is cracked without tempering, gelantinized and then hydrolyzed by amylases before fermentation. However, separation of corn protein from the hydrolyzed syrup is necessary for the production of high fructose syrup, and purified starch is the preferred raw material. Therefore, wet milling is commonly employed for production of high fructose syrup.

Since the demand for high fructose corn syrup and alcohol increased during the 1970's, it has become desirable to develop a process which is more flexible in the production of final products and, which has smaller operating costs than the conventional processes which, as described above, are either energy intensive or lack flexibility in producing various products. Importantly, any new process should be adaptable to existing corn milling plants. Many different dry milling processes have been developed to produce high fructose syrup, but these processes all ignore the recovery of corn oil, and lack the flexibility to produce granule starch and edible protein. For example, one method employs a dry milling process followed by hydrolysis of starch before separation of corn protein and lipid by filtration. However, such a method encounters problems in the separation of protein, and does not recover corn oil. Further, the process lacks the flexibility to produce high purity granular corn starch, and edible corn protein.

Accordingly, it is a primary object of the present invention to provide an economic process by which corn or other grains are leached with an ethanol solution to yield grain oil while simultaneously dehydrating ethanol. The residue of the leaching step can be processed to yield edible grain protein and grain starch. The starch fraction can be further processed to yield granule starch or hydrolyzed starch to be processed still further to produce alcohol or high fructose syrup.

A further object of the present invention is to provide a process which is easily adaptable to conventional milling operations.

SUMMARY OF THE INVENTION

The present invention relates to a grain milling process for the production of oil, dehydrated alcohol, grain protein and starch. The process can be applied to grains such as corn, rice, sorghum and wheat. Corn is referred to below for the purpose of illustration but should not be limiting.

For the case of corn, the process comprises the steps of: (a) drying cracked corn to a moisture level of less than 4% (w/w); (b) leaching the dry corn with an ethanol solution of 90 to 100% (w/v) ethanol in the liquid phase. The alcohol is dehydrated during the leaching step to form a concentrate above 99.5%, and crude corn oil is eluted; (c) subjecting the residue of step (b) to further extraction for food grade corn protein with an ethanol solution (50 to 70% w/v) containing NaOH; (d) separating starch and fiber in the residue by grinding the residue further and then separating the starch and fiber by a screen and/or centrifuge, or by subjecting the residue to starch hydrolysis in a steam jet cooker, followed by filtration to remove fiber.

DETAILED DESCRIPTION OF THE INVENTION

Figure 1:
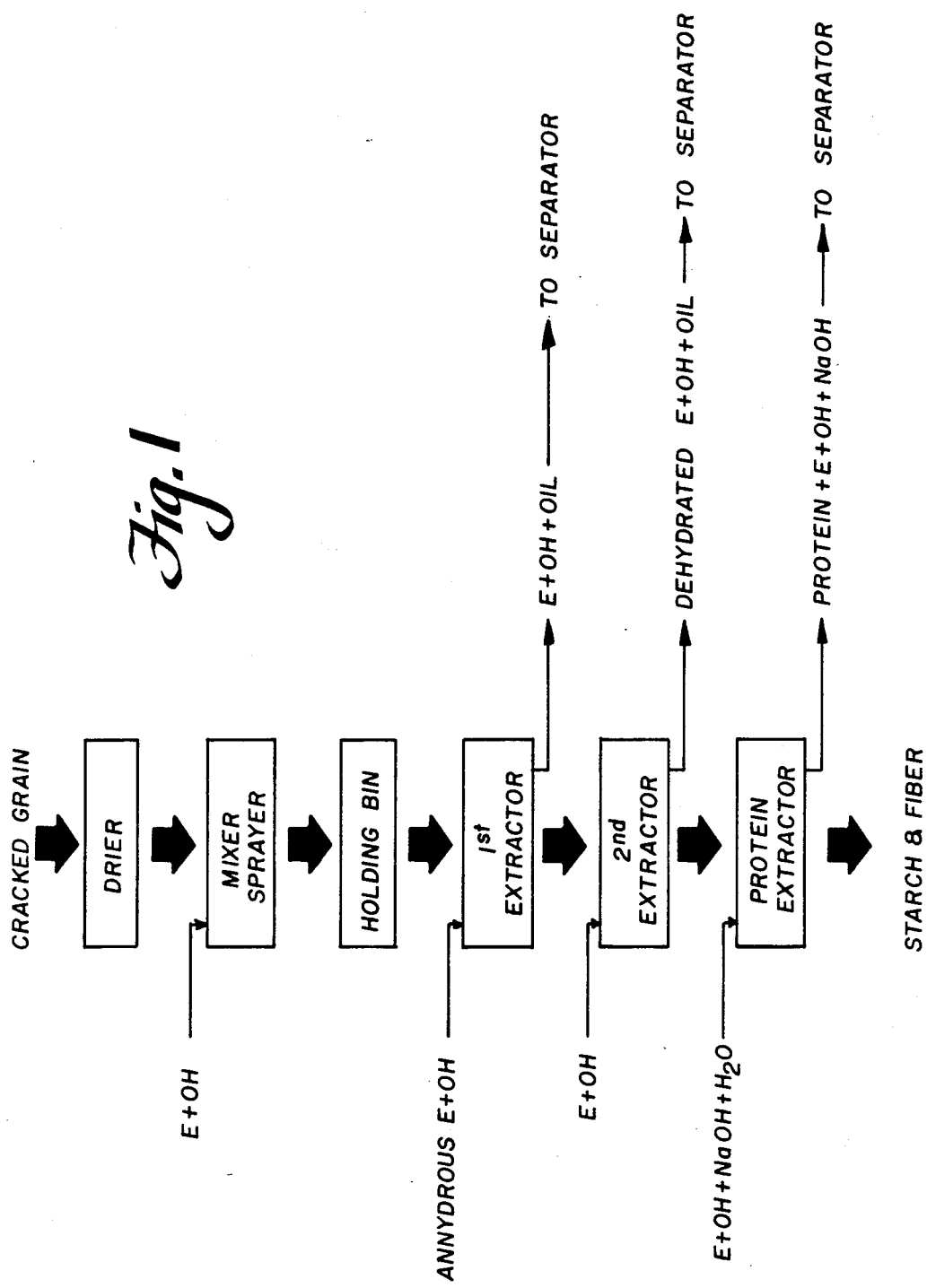
FIGS. 1 and 2 depict a process configuration which may be used in accordance with the present invention.
Figure 2:
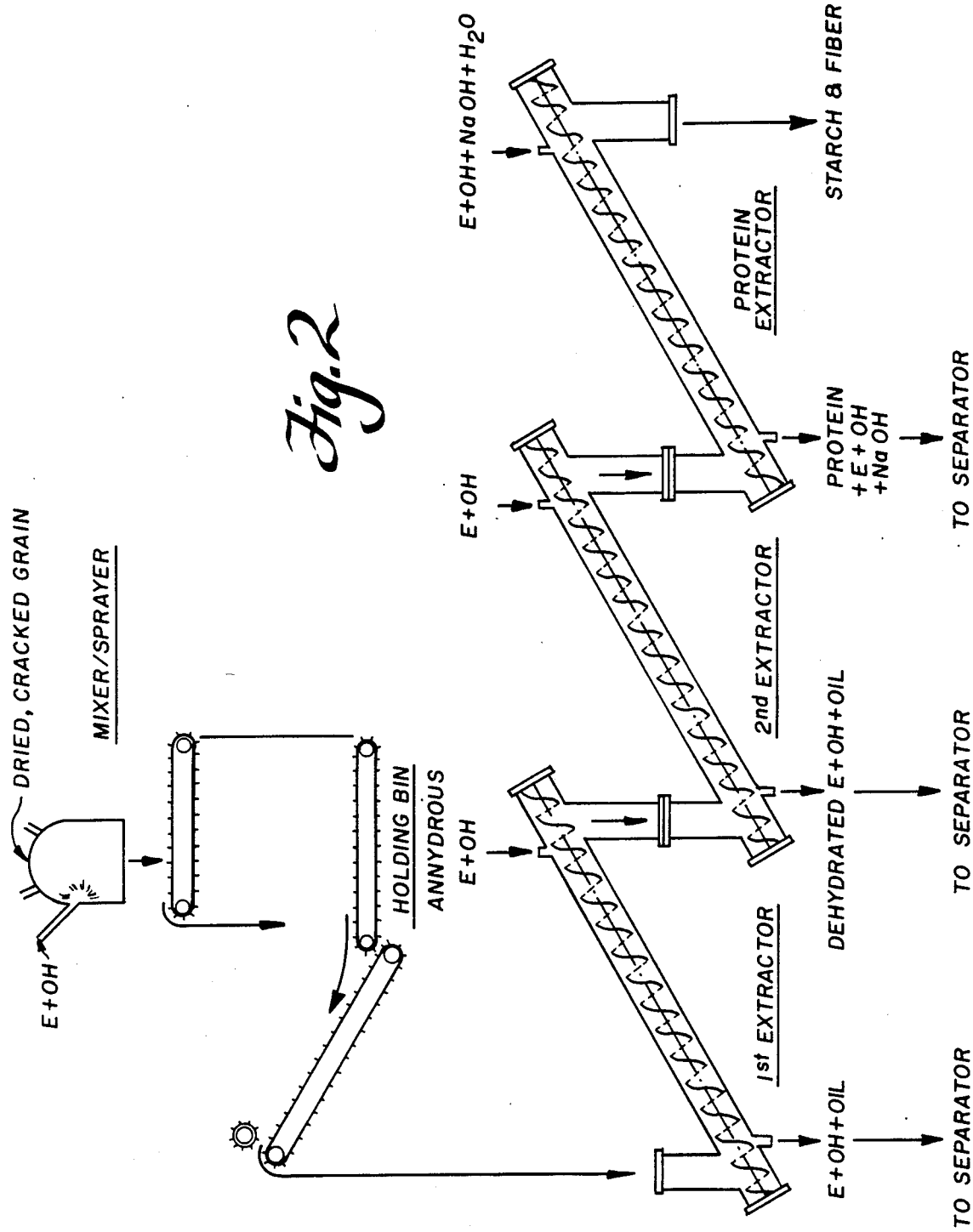

The present invention generally provides a method for the production of grain oil, edible grain protein, dehydration of alcohol, production of grain fiber, and starch. FIGS. 1 and 2 depict a configuration which can be used with the present invention.

Figure 3:
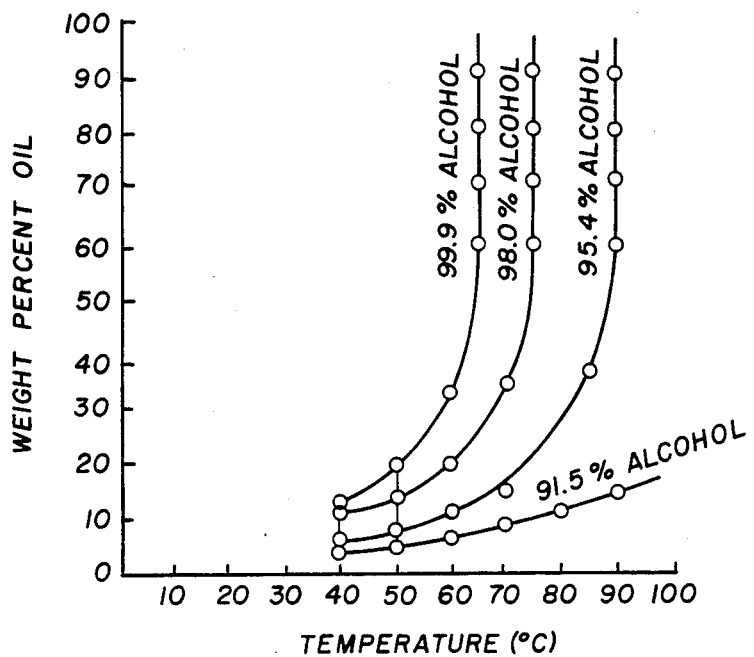
FIG. 3 shows solubility curves for corn oil in ethanol.

With reference to corn for the purpose of illustration, the method comprises the steps of:

cracking corn advantageously to a size range of from 100 mesh to 16 mesh;

drying the cracked corn to a moisture content sufficiently low to dehydrate an ethanol solution of greater than 90% ethanol, i.e. less than 4% moisture in the dried corn, with air advantageously at a temperature above 70° C., more advantageously from 70°–90° C.;

extracting corn oil from the cracked corn, the extracting temperature being between room temperature and the boiling point of the ethanol solution which is used as an extractant to leach corn oil, advantageously between 60° C. and the boiling point of the ethanol solution (see FIG. 3). The alcohol concentration is advantageously above 90% w/v. Ethanol and water form an azeotrope at about 95% ethanol, and thus in order to obtain ethanol of purity greater than about 95%, more than evaporation is necessary. For a column packed with 800 grams of dried corn, and an extractant flow rate of 100 ml/hr, the corn oil yield is at least 90% in the ethanol solution. Crude oil, and dehydrated alcohol at a concentration above 99.5%, can be obtained from the eluent by evaporation. The crude oil can be further fractionated to yield neutral fats and polar lipids as separate products by conventional methods. Alternatively, the dried corn can be treated, e.g., soaked or sprayed with a solution of greater from 90% ethanol before it is extracted. The pretreatment improves the rate of extraction (see FIG. 4).

Extracting corn protein from the extraction residue is carried out using an ethanol solution at a concentration which maximizes protein solubility, i.e. such that the resulting ethanol concentration in the residue is 50–70% w/v, advantageously 60% w/v, and with NaOH at a concentration such that the solubility of the protein is maximized, e.g. 0.05 to 0.15 N, advantageously about 0.1 N. The extracting temperature should be below the gelatinization temperature, i.e. 50° C. to 70° C., advantageously less than about 76° C. If only the zein fraction of the corn protein is to be extracted, the extractant should not include NaOH.

Starch and corn fiber are then separated by hydrolyzing the residue in a steam jet cooker or a vat with amylases, followed by filtration to remove fiber. The hydrolyzed starch can be used for fermentation purposes or for the production of high fructose syrups. Alternatively, the residue can be ground in a mill, and the granule starch and fiber is separated with a screen or by centrifugation.

The present invention has the following advantages: (1) The process is not energy intensive and may require a lower capital investment than a conventional dry milling process. (2) Corn oil and dehydrated alcohol are recovered, which add to the by-product credits, thus lowering the production costs. (3) The process can produce edible corn protein as an added value product. (4) The process provides flexibility for utilization of corn starch fractions. Corn can be processed to yield granular starch, corn syrup, high fructose syrup. (5) The process increases the efficiency of separation, and thus the yield of starch can be increased. (6) The present process, in contrast to conventional wet milling processes, does not require sulfur dioxide which is an environmental pollutant. (7) The process can be used in existing wet milling plants without substantial modification of the plant. (8) The process can be continuous.

The efficiency of corn oil extraction by alcohol depends on several factors. These are temperature, alcohol concentration, moisture content of the corn, and particle size of the cracked corn. In general, high temperature and high alcohol concentration increase the solubility of corn oil in ethanol (see FIG. 3). A pretreatment such as soaking or spraying the dried corn with ethanol as shown in FIGS. 1 and 2, prior to the corn oil extraction, results in a higher extraction rate (see FIG. 4).

Moisture in the cracked corn affects the efficiency of corn oil extraction and alcohol dehydration. If the alcohol is not dehydrated by the grain, the efficiency of the oil extraction is low (see FIG. 3). For the case of a packed column, therefore, the corn oil at the upper portion of the column is not extracted completely since the alcohol solution is not sufficiently dehydrated. To remedy this problem, anhydrous ethanol can be applied to the column before introducing ethanol at a lower concentration. For the case of a continuous process, anhydrous ethanol can be fed to a first extractor (see FIGS. 1 and 2).

The particle size of the cracked corn determines the efficiency of oil extraction. Therefore, the particle sizes of the cracked corn should be small enough to facilitate the corn oil extraction, but large enough to prevent clogging of the extractor.

Gelatinization of the starch during extraction can be repressed by alcohol, and the degree of repression is dependent on the concentration of the alcohol. The gelatinization of starch should be avoided during the extraction of both corn oil and corn protein. Since the temperature is the most critical factor for an efficient extraction, control of the ethanol concentration to prevent gelatinization is very critical in the subject process.

Provided the cracked corn has been dehydrated to a moisture content of less than 1%, corn oil can be recovered in one void volume of extractant at a concentration of about 15% w/v. Simultaneously, the ethanol is dehydrated to a concentration above 99.5% in one void volume of extractant. The extracted corn oil contains polar lipids and neutral fats, and can be further fractionated by procedures commonly used in corn oil refining.

Corn protein can be extracted into two separate fractions (zein and glutenin), or as a mixture of the two. To obtain this mixture, an alcohol solution containing about 0.1N of NaOH is added to the extractor, and the extracted protein is partially deamidated and some sulfhydryl groups are generated during extraction. The resultant protein is more water soluble than native corn protein.

The residual product after the extraction of corn oil and protein is comprised of fiber and starch granules. At this stage the corn fiber is pliable. The residue can be subjected to enzymatic, amlolytic hydrolysis in a jet cooker, or be ground further. If the grinding method is chosen the starch granules are released from the coarse particles while the fiber fraction, because of its pliable characteristics, is not disintegrated. Thus, starch and fiber can be separated by a screen to obtain a starch purity above 95%, or if a purity of starch above 99% is desirable, a centrifuge can be employed.

As noted above, the present invention can be applied to grains other than corn. For example, rice can be milled to rice oil, edible rice protein, and purified granular rice starch, while simultaneously producing dehydrated ethanol. Commercially available rice products include rice bran, rice polish and milled rice; all these products are mixtures of starch and protein which contain various levels of fat. Similarly, sorghum, wheat and other grains can be milled by the method to produce oil, protein and purified starch.

When ethanol is used for the extraction of grain oil, phospholipids are extracted and can then be separated. Phospholipids are natural emulsifiers which cannot be extracted efficiently with hexane which is used in current industrial processes. Residual phospholipids in grain can become rancid. Therefore, by using ethanol as an extractant, the shelf-life of milled grains can be improved, and a new phospholipid source is provided.

In a preferred embodiment of the invention, the grain is extracted in a screw extractor which permits a continuous flow of the grain and extractant (see FIG. 2).

The following examples are offered in order to more fully illustrate the invention, but are not to be construed as limiting the scope thereof.

EXAMPLE I

Cracked corn was dried in an oven at 80° C. for 8 hours and then at 90° C. for 18 hours to reduce the moisture content to below 1% by weight. The dried corn (800 gm) was packed in a column 2 inches in diameter and 26 inches in length. The column was maintained at 65° to 67° C. (also in Examples 2-5 below), and ethanol solution (95%) was pumped into the column at a rate of 100 ml/hr. By collecting one void volume of the effluent (600 ml), about 90% of the corn oil was recovered at a concentration of 6.25% w/v. The effluent contained less than 1% moisture. The eluent was then changed to a 50% ethanol solution for protein extraction at 100 ml/hr. After collecting one column void volume, the effluent contained protein (zein) at a concentration of about 2.8% w/v, and the protein recovery was 40% based on the total corn protein. The eluent was again changed to 50% ethanol containing 0.08 N NaOH for further extraction of protein (glutenin). An additional 20% of corn protein at a concentration of about 1% w/v was obtained in 3.7 void column volumes. The residue was then subjected to enzymatic hydrolysis in a jet cooker.

EXAMPLE II

Eight hundred grams of the cracked and dried corn was packed into the column noted above, and corn oil was extracted as described in Example I. The protein was then extracted with 50% ethanol solution containing 0.08 N of NaOH. The protein recovery after collecting 5.5 column void volumes was 80% of the total corn protein. The residual product was then subjected to enzymatic hydrolysis in a jet cooker.

EXAMPLE III

Eight hundred grams of cracked and dried corn was packed in a column reactor as described above. One hundred ml of 100% ethanol was pumped into the column and was followed by eluting at a flow rate of 100 ml/hr the column with 95% ethanol. After collecting one void volume of effluent, the corn oil recovery was 93% and the moisture content in the effluent was less than 0.6%.

EXAMPLE IV

Eight hundred grams of cracked and dried corn was packed and extracted as described in Example I. The residue was then subjected to blending for 8 minutes in a Waring blender with reversed blades. The residue was then sieved using a screen of 100 mesh. The portion which passed through the screen comprised granule starch with 90% purity. The yield of starch was 66% based on dry corn.

EXAMPLE V

Eight hundred grams of cracked and dried corn was packed and extracted as described in Example I. The residue was then subjected to grinding in a Waring blender with reversed blades and was sieved as described in Example IV. The portion which passed through the screen formed two layers. The upper layer was removed by peeling it off. The bottom fraction contained granular starch with a purity above 99% w/w. The yield of purified starch was about 56% based on the dry corn weight.

EXAMPLE VI

Figure 4:
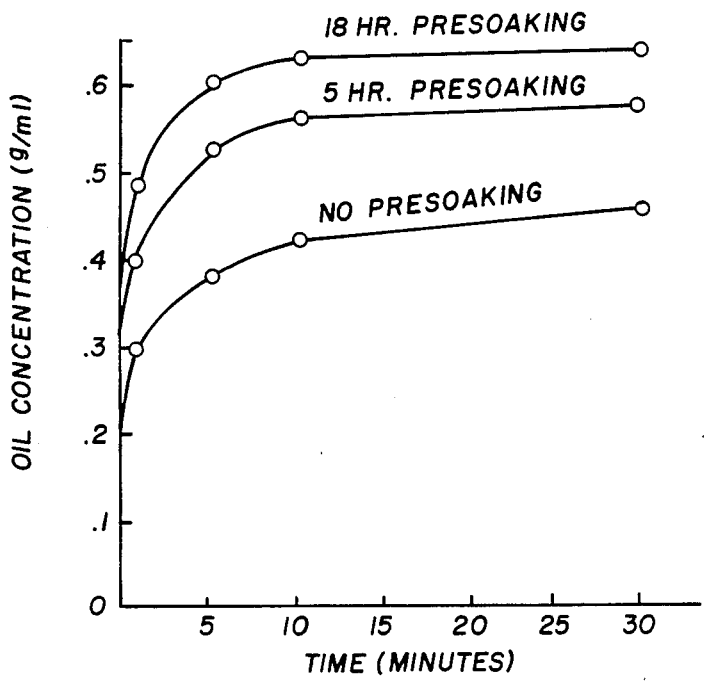
FIG. 4 shows the effects of a soaking pretreatment before extraction.

As a comparative example, cracked and dried corn (7.5 grams) was subjected to corn oil extraction with 60 ml of 100% ethanol. The time course of oil extraction at 70° C. is shown in FIG. 4.

EXAMPLE VII

Cracked and dried corn (7.5 grams) was soaked in 2 ml of 100% ethanol for 5 hours, and was then extracted with an additional 58 ml of 100% ethanol. The time course of oil extraction at 70° C. is shown in FIG. 4. The corn oil extraction rate and the yield are greater for corn presoaked in ethanol. It is expected that the protein extraction rate should also be increased if the residual corn is soaked in the alkaline-ethanol solution after oil extraction.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A process for the production of grain oil and dehydrated alcohol comprising the steps of:
   cracking the grain;
   drying the grain to a moisture content sufficiently low to enable the grain to dehydrate an ethanol solution of greater than 90% ethanol, while simultaneously
   extracting grain oil from the dried grain with an ethanol solution of greater than 90% ethanol, and
   recovering the grain oil and dehyrated alcohol from the extractant.

2. A process as in claim 1 wherein the grain is corn.

3. A process as in claim 2 wherein the drying step includes the step of drying the corn to a moisture content of less than about 4% w/w.

4. A process as in claim 1 wherein the grain is selected from the group consisting of wheat, sorghum and rice.

5. A process as in claim 1 wherein the process is continuous.

6. process as in claim 1 wherein the process is a batch process.

7. A process as in claim 1 wherein the recovering step includes the step of recovering the dehydrated alcohol by evaporation.

8. A process as in claim 1 wherein the recovering step includes the step of fractionating the grain oil to yield neutral fats and polar lipids as separate products.

9. A process as in claim 1 wherein the extracting step includes the step of extracting with an ethanol solution at a temperature between room temperature and the boiling point of the ethanol solution.

10. A process as in claim 1 further comprising before the extracting step, the step of soaking or spraying the grain with an ethanol solution of greater than 90% ethanol.

11. A process as in claim 1 wherein the cracking step includes the step of reducing the grain to a size range of from 100 to 16 mesh.

12. A process as in claim 1 wherein the drying step includes the step of drying the grain with air.

13. A process for the production of grain oil, dehydrated alcohol, grain protein and starch, comprising the steps of:
   (a) cracking the grain,
   (b) drying the grain to a moisture content sufficiently low to dehydrate an ethanol solution of greater than 90% ethanol while simultaneously (c) extracting oil from the dried grain with a first ethanol solution of greater than 90% ethanol,
(d) recovering oil and dehydrated alcohol from the first extractant,
(e) extracting grain protein from the residue of step (c) with a second ethanol solution wherein the ethanol concentration is that which maximizes the protein solubility,
(f) recovering the protein from the second extractant,
(g) recovering starch from the residue of step (f).

14. A process as in claim 13 wherein the grain is corn.

15. A process as in claim 14 wherein the drying step includes the step of drying the corn to a moisture content of less than aout 4% w/w.

16. A process as in claim 13 wherein the grain is selected from the group consisting of wheat, sorghum and rice.

17. Aprocess asin claim 13 wherein the second ethanol solution contains NaOH.

18. A proces as in claim 13, wherein the cracking step includes the step of reducing the grain to a size range of from 100 to 16 mesh.

19. A process as in claim 13, wherein the drying step includes the step of drying the grain with air.

20. A process as in claim 13, wherein the process is continuous.

21. A process as in claim 13 wherein the process is a batch process.

22. A process as in claim 13, wherein the recovering step (d) includes the step of recovering the dehydrated alcohol by evaporation.

23. A process as in claim 13, wherein the recovering step (d) includes the step of fractionating the grain oil to yield neutral fats and polar lipids as separate products.

24. A process as in claim 14, wherein the extracting step (e) includes the step of extracting corn protein with a second ethanol solution containing 0.05 to 0.15 N NaOH.

25. A process as in claim 14, wherein the extracting step (c) includes the step of extracting corn oil at a temperature from 60° C. to the boiling point of the first ethanol solution.

26. A process as in claim 14, wherein the extracting step (e) includes the step of extracting corn protein with a 50-70% ethanol solution at a temperature from 50° to 70° C.

27. A process as in claim 14, wherein the extracting step (e) includes the step of extracting corn protein with a second ethanol solution without NaOH.

28. A process as in claim 13, wherein the recovering step (g) includes the step of hydrolyzing the residue of step (f) in a steam jet cooker or a vat with amylases, and then filtering the hydrolyzed material to remove fiber.

29. A process as in claim 13, wherein the recovering step (g) includes the step of grinding the residue of step (f) in a mill and separating the starch with a screen or by centrifugation.

30. A process as in claim 13 further comprising before the extracting step (c), the step of soaking or spraying the grain with an ethanol solution of greater than 90% ethanol.

* * * * *